US012760449B2

(12) United States Patent
Matsumoto

(10) Patent No.: US 12,760,449 B2
(45) Date of Patent: Oct. 13, 2026

(54) STRAND, DRIVING PART, METHOD FOR PRODUCING STRAND, AND WINDING BODY

(71) Applicant: Mitsubishi Gas Chemical Company, Inc., Tokyo (JP)

(72) Inventor: Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 80 days.

(21) Appl. No.: 18/685,431

(22) PCT Filed: May 18, 2022

(86) PCT No.: PCT/JP2022/020614
§ 371 (c)(1),
(2) Date: Feb. 21, 2024

(87) PCT Pub. No.: WO2023/026608
PCT Pub. Date: Mar. 2, 2023

(65) Prior Publication Data
US 2025/0122651 A1 Apr. 17, 2025

(30) Foreign Application Priority Data
Aug. 25, 2021 (JP) ................................ 2021-137186

(51) Int. Cl.
*D02G 3/44* (2006.01)
*B29C 48/05* (2019.01)
(Continued)

(52) U.S. Cl.
CPC ............... *D02G 3/447* (2013.01); *D02G 3/02* (2013.01); *D02G 3/32* (2013.01); *D02G 3/36* (2013.01);
(Continued)

(58) Field of Classification Search
None
See application file for complete search history.

(56) References Cited

U.S. PATENT DOCUMENTS 4,642,080 A * 2/1987 Takano .................. F16G 5/166
474/263
5,366,816 A * 11/1994 Harada ................ C04B 35/462
428/614
(Continued)

FOREIGN PATENT DOCUMENTS

CA 1208863 A 8/1986
CN 205061274 U 3/2016
(Continued)

OTHER PUBLICATIONS

Machine Translation of JPH06263230 (Year: 1994).*
(Continued)

*Primary Examiner* — Shawn Mckinnon
(74) *Attorney, Agent, or Firm* — Fitch, Even, Tabin & Flannery LLP

(57) ABSTRACT

To provide a strand having excellent slidability, a driving part, a method for producing a strand, and a winding Body. A strand including a core material containing a reinforcing fiber impregnated with an elastomer, and a covering layer containing a thermoplastic resin. A driving part including a first member including a strand, and a second member being in contact with the strand of the first member and containing a thermoplastic resin.

14 Claims, 3 Drawing Sheets

(51) Int. Cl.

| | |
|---|---|
| ***B29C 48/154*** | (2019.01) |
| ***B29K 77/00*** | (2006.01) |
| ***B29K 105/16*** | (2006.01) |
| ***B29K 307/04*** | (2006.01) |
| ***B29K 509/00*** | (2006.01) |
| ***B29K 667/00*** | (2006.01) |
| ***D02G 3/02*** | (2006.01) |
| ***D02G 3/32*** | (2006.01) |
| ***D02G 3/36*** | (2006.01) |
| ***D02G 3/38*** | (2006.01) |
| ***D02G 3/40*** | (2006.01) |

(52) U.S. Cl.
CPC ............... *D02G 3/38* (2013.01); *D02G 3/404* (2013.01); *B29C 48/05* (2019.02); *B29C 48/154* (2019.02); *B29K 2077/00* (2013.01); *B29K 2105/16* (2013.01); *B29K 2307/04* (2013.01); *B29K 2509/00* (2013.01); *B29K 2667/00* (2013.01); *B29K 2713/02* (2013.01); *B29K 2995/0077* (2013.01); *D10B 2101/12* (2013.01); *D10B 2331/04* (2013.01); *D10B 2505/02* (2013.01)

(56) References Cited

U.S. PATENT DOCUMENTS

| | | | | |
|---|---|---|---|---|
| 9,404,202 | B2 * | 8/2016 | Lawrence ................ | D02G 3/04 |
| 2004/0050580 | A1 | 3/2004 | Hager et al. | |
| 2004/0077771 | A1 * | 4/2004 | Wadahara .............. | C08G 69/36 524/495 |
| 2005/0042447 | A1 | 2/2005 | Conesa et al. | |
| 2015/0307321 | A1 | 10/2015 | Breite et al. | |

FOREIGN PATENT DOCUMENTS

| | | | |
|---|---|---|---|
| CN | 205223714 | U | 5/2016 |
| CN | 106761441 | A | 5/2017 |
| CN | 109468870 | A | 3/2019 |
| CN | 101622312 | A | 1/2021 |
| EP | 0198567 | A2 | 10/1986 |
| JP | S51-047062 | U | 10/1977 |
| JP | S52-143447 | A | 11/1977 |
| JP | H62-53495 | A | 9/1994 |
| JP | H062-63230 | A | 9/1994 |
| JP | S62-53495 | A | 9/1994 |
| JP | 2000-27082 | A | 1/2000 |
| JP | 2007-147047 | A | 6/2007 |
| JP | 2009-127038 | A | 6/2009 |
| JP | 2010-124569 | A | 6/2010 |
| JP | 2017-179634 | A | 10/2017 |
| JP | 2017-206590 | A | 11/2017 |
| WO | 2015/162263 | A1 | 10/2015 |
| WO | 2017/138228 | A1 | 8/2017 |

OTHER PUBLICATIONS

Extended European Search Report issued in corresponding European Patent Application No. 22860905.3; dated Nov. 7, 2024; 8 pages.

International Search Report and Written Opinion for PCT/JP2022/020614, mailed Jul. 12, 2022 and English translation of the International Search Report and Written Opinion (13 pages).

International Preliminary Report on Patentability for PCT/JP2022/020614, issued Feb. 27, 2024 and English translation of International Preliminary Report on Patentability (8 pages).

Office Action issued in corresponding Japanese Patent Application No. 2023-543692; Feb. 24, 2026; 7 pages.

Office Action issued in corresponding Chinese Patent Application No. 202280056975.9; dated Aug. 23, 2025; 10 pages.

* cited by examiner

STRAND, DRIVING PART, METHOD FOR PRODUCING STRAND, AND WINDING BODY

CROSS-REFERENCE TO RELATED APPLICATIONS

This application is a U.S. national phase application filed under 35 U.S.C. § 371 of International Application Number PCT/JP2022/020614, filed May 18, 2022, designating the United States, which claims priority from Japanese Application Number 2021-137186, filed Aug. 25, 2021.

FIELD OF THE INVENTION

The present invention relates to a strand, a driving part, a method for producing a strand, and a winding body.

BACKGROUND OF THE INVENTION

For example, a strand (also called a wire) has been used as a rope, a wire, and a cable of a suspension bridge and a structure; anchoring of a ship, a marine surveying machine, and a buoy; a tension member for a driving mechanism, various messenger wires, and a power transmission line.

Formerly, a strand used for such purposes has been mainly made of a steel material. However, in recent years, various types of strands each made of a carbon fiber, reinforced plastic, or the like have been developed (Patent Document 1, Patent Document 2, Patent Document 3, and Patent Document 4).

CITATION LIST

Patent Documents

Patent Document 1: JP 2000-027082 A
Patent Document 2: JP 2010-124569 A
Patent Document 3: CN-U-205061274
Patent Document 4: EP 0198567 A2

SUMMARY OF INVENTION

In a case where a strand made of a fiber-reinforced plastic is used for a driving part, such as a belt, a gear wheel, or a cam, slidability is required.

An object of the present invention is to solve such problems and to provide a strand having excellent slidability, a driving part, a method for producing a strand, and a winding Body.

Solution to Problem

For the object described above, as a result of research by the inventors of the present invention, the problem described above was resolved by using a reinforcing fiber and an elastomer in a core material, providing a covering layer covering the core material, and using a thermoplastic resin in the covering layer.

Specifically, the problems described above are solved by the following solutions.

<1> A strand including:

a core material containing a reinforcing fiber impregnated with an elastomer; and a covering layer containing a thermoplastic resin.

<2> The strand according to <1>, where the elastomer is a thermosetting elastomer.

<3> The strand according to <2>, where an elastic modulus A and an elastic modulus satisfy (the elastic modulus A/the elastic modulus B)<0.00500, where the elastic modulus A is measured in accordance with JIS K 7161:2019 after the elastomer is heated at a curing temperature of the elastomer for 2 hours and then subjected to temperature and humidity adjustment at 23° C. and a relative humidity of 55% for 2 weeks, and the elastic modulus B is measured in accordance with JIS K 7161:2019 after an ISO test piece having a thickness of 4 mm made of a covering layer composition constituting the covering layer is dried at 120° C. for 1 hour.

<4> The strand according to any one of <1> to <3>, where the covering layer contains a filler material having an aspect ratio (long side/short side) of 10 or greater.

<5> The strand according to <4>, where the filler material having the aspect ratio (long side/short side) of 10 or greater contains a potassium titanate whisker.

<6> The strand according to any one of <1> to <5>, where the thermoplastic resin contains a polyamide resin.

<7> The strand according to <6>, where the polyamide resin contains diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms.

<8> The strand according to any one of <1> to <7>, where the elastomer is an elastomer containing a styrene unit.

<9> The strand according to any one of <1> to <8>, where the reinforcing fiber is covered by yarn containing a polyester resin.

<10> The strand according to any one of <1> to <9>, where the reinforcing fiber contained in the core material contains a carbon fiber.

<11> The strand according to any one of <1> to <10>, where an elastic modulus A and an elastic modulus B satisfy (the elastic modulus A/the elastic modulus B)<0.00500, where the elastic modulus A is measured in accordance with JIS K 7161:2019 after the elastomer is heated at a curing temperature of the elastomer for 2 hours and then subjected to temperature and humidity adjustment at 23° C. and a relative humidity of 55% for 2 weeks, and the elastic modulus B is measured in accordance with JIS K 7161:2019 after an ISO test piece having a thickness of 4 mm made of a covering layer composition constituting the covering layer is dried at 120° C. for 1 hour; and the covering layer contains a filler material having an aspect ratio (long side/short side) of 10 or greater.

<12> The strand according to any one of <1> to <11>, where the covering layer contains a filler material having an aspect ratio (long side/short side) of 10 or greater and containing a potassium titanate whisker;

the thermoplastic resin contains a polyamide resin containing diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms.

the elastomer contains an elastomer containing a styrene unit;

the reinforcing fiber is covered by yarn containing a polyester resin; and the reinforcing fiber contained in the core material contains a carbon fiber.

<13> A driving part including:

a first member including the strand described in any one of <1> to <12>; and a second member being in contact with the strand of the first member and containing a thermoplastic resin.

<14> The driving part according to <13>, where the second member contains a polyamide resin and a filler material having an aspect ratio (long side/short side) of 10 or greater.

<15> The driving part according to <13> or <14>, where the second member contains a polyamide resin containing diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms, and a potassium titanate whisker.

<16> The driving part according to <15>, where a composition of a covering layer of the strand and 70 mass % or greater of a composition of the second member are common.

<17> The driving part according to any one of <13> to <16>, where an elastic modulus B and an elastic modulus C satisfy 0.5≤(the elastic modulus B/the elastic modulus C)≤2.0, where the elastic modulus B is measured in accordance with JIS K 7161:2019 after an ISO test piece having a thickness of 4 mm made of a covering layer composition constituting the covering layer of the first member is dried at 120° C. for 1 hour, and the elastic modulus C is measured in accordance with JIS K 7161:2019 after an ISO test piece having a thickness of 4 mm made of a second member composition constituting the second member is dried at 120° C. for 1 hour.

<18> A method for producing a strand, the method including:

forming a covering layer by extruding a covering layer composition containing a thermoplastic resin on an outer side of a core material containing a reinforcing fiber impregnated with an elastomer.

<19> The method for producing a strand according to <18>, where a yarn containing a polyester resin covers the reinforcing fiber, and a melting point of the polyester resin is higher than a melting point of the thermoplastic resin contained in the covering layer composition.

<20> The method for producing a strand according to <18> or <19>, where the strand is a strand described in any one of <1> to <12>.

<21> A winding Body including:

the strand described in any one of <1> to <12>; and a core for winding, the core having a radius of 76.2 mm or less, where the strand is wound around the core.

According to the present invention, a strand having excellent slidability, a driving part, a method for producing a strand, and a winding Body can be provided.

DESCRIPTION OF EMBODIMENTS

Hereinafter, embodiments for carrying out the present invention (referred to simply as "the present embodiments" below) will be described in detail. Note that the following embodiments are examples for describing the present invention, and the present invention is not limited to these embodiments.

In the present specification, "from . . . to . . . " or "of . . . to . . . " is used to mean that the numerical values described before and after "to" are included as the lower limit and the upper limit, respectively.

In the present specification, various physical property values and characteristic values are values at 23° C. unless otherwise noted.

When a measurement method or the like of a standard set forth in the present specification differs depending on the year, it is based on the standard as of Jan. 1, 2021 unless otherwise stated.

Strand

The strand of the present embodiment includes a core material containing a reinforcing fiber impregnated with an elastomer, and a covering layer containing a thermoplastic resin. With such a configuration, the strand having excellent slidability can be obtained.

Figure 1:
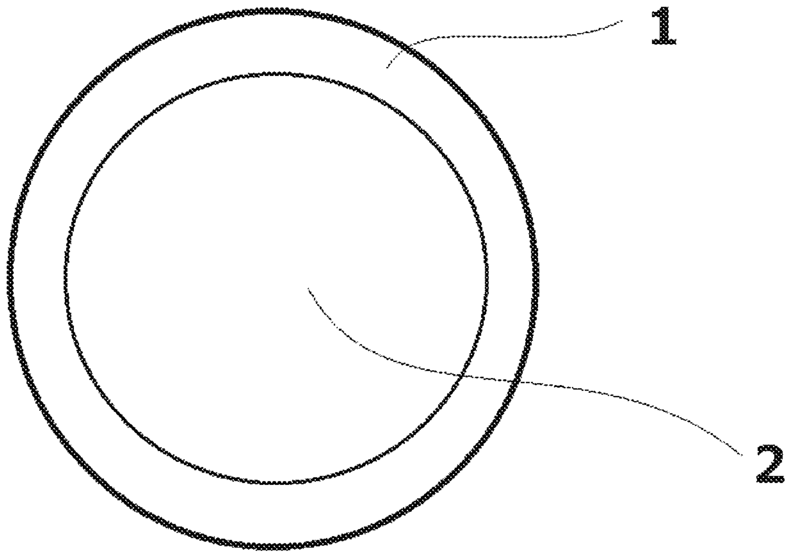
FIG. 1 is a cross-sectional schematic view of a strand of the present embodiment.

FIG. 1 is a cross-sectional schematic view of a strand of the present embodiment, and 1 is a covering layer, and 2 is a core material. The covering layer is typically in contact with the core material.

When the strand is used in a driving part, winding properties (driving properties) are also required; however, the strand of the present embodiment can also achieve excellent winding properties. Specifically, the strand of the present embodiment can be, for example, formed into a winding Body obtained by winding the strand around a core for winding having a radius of 76.2 mm or less, or a core for winding having a radius of 20.0 mm or less. For the lower limit of the radius of the core for winding. 5 mm or more is practical. As long as the radius of the core for winding satisfies the minimum winding radius of the strand of Examples described below, winding around the core for winding can be performed.

Furthermore, because the strand of the present embodiment may have a configuration substantially free of metals, a strand having excellent lightweight property can be obtained. "Substantially free of metals" means that the metal content is 3 mass % or less in the strand of the present embodiment, and the metal content is preferably 1 mass % or less.

The core material in the present embodiment is a part serving as a core of a strand and includes a reinforcing fiber impregnated with an elastomer. It is presumed that the reinforcing fiber carries out a function of imparting tensile strength to the strand, and the elastomer carries out a function of imparting softness and flexibility to the strand.

Figure 2:
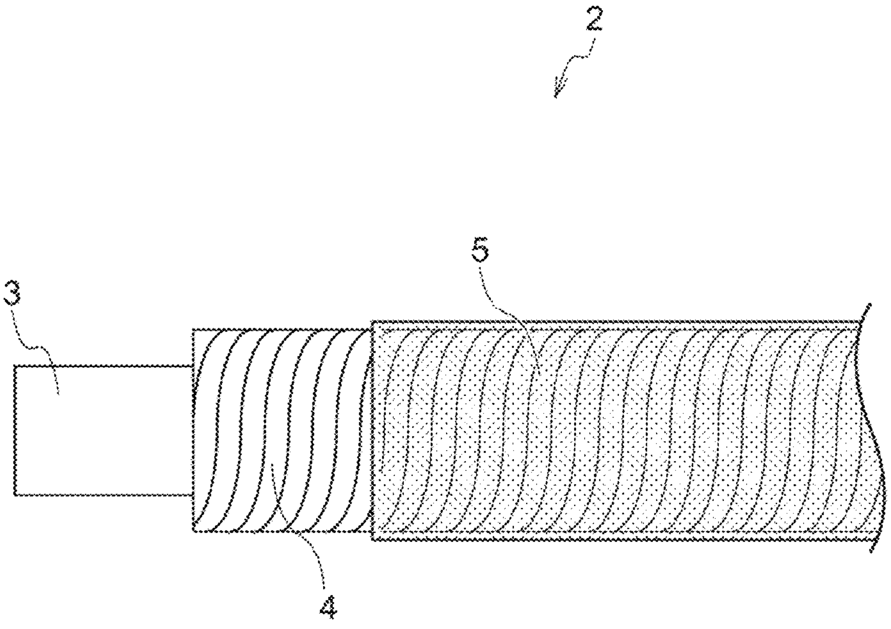
FIG. 2 is a schematic view illustrating an example of a core material used in the present embodiment.

FIG. 2 is a schematic view illustrating an example of a core material used in the present embodiment, and 3 illustrates a reinforcing fiber, 4 illustrates a polyester fiber (a yarn containing a polyester resin), and 5 illustrates an elastomer. In the embodiment of FIG. 2, after the reinforcing fiber 3 is covered by the polyester fiber 4, the elastomer 5 is allowed to infiltrate. Typically, a part of the elastomer 5 infiltrates into the inside of the reinforcing fiber, and a part of the elastomer 5 is present on the outer surface of the reinforcing fiber 3 and the polyester fiber 4.

The reinforcing fiber used in the present embodiment may be a known resin reinforcing fiber. In the present embodiment, the reinforcing fiber is preferably a continuous reinforcing fiber.

The reinforcing fiber used in the present embodiment is typically a reinforcing fiber bundle. The number of filaments constituting the reinforcing fiber bundle is preferably 2400 or greater, and preferably 240000 or less. By setting the number to not lower than the lower limit value, superior productivity tends to be achieved. By setting the number to not higher than the upper limit value, superior moldability tends to be achieved.

The average fiber length of the reinforcing fibers is not particularly limited, but from the viewpoint of molding processability, the average fiber length is preferably 5 cm or more, more preferably 1 m or more, and even more preferably 100 m or more, and preferably 10000 m or less.

From the viewpoint of molding processability and the viewpoint of easily obtaining a high strength and a high elastic modulus, the average fineness of the reinforcing fiber bundle is preferably 50 tex (g/1000 m) or more, more preferably 200 tex or more, and even more preferably 500 tex or more. Furthermore, the average fineness is preferably 2000 tex or less, more preferably 1500 tex or less, and even more preferably 1000 tex or less.

Also, the average tensile modulus of the reinforcing fiber bundle is preferably 50 GPa or more and preferably 1000 GPa or less.

Examples of materials of the reinforcing fibers include inorganic fibers, such as glass fibers, carbon fibers, metal fibers, boron fibers, basalt fibers, and ceramic fibers; and organic fibers, such as aramid fibers, polyoxymethylene fibers, aromatic polyamide fibers, polyparaphenylene benzobisoxazole fibers, and ultra-high molecular weight polyethylene fibers. Among these, inorganic fibers are preferable from the viewpoint of obtaining a high strength, and at least one type selected from the group consisting of glass fibers, carbon fibers, and basalt fibers is more preferable because of the fibers being lightweight with high strength and a high elastic modulus, and carbon fibers are even more preferable.

Examples of carbon fibers include polyacrylonitrile-based carbon fibers and pitch-based carbon fibers. In addition, a carbon fiber made from a plant-derived raw material, such as lignin or cellulose, can also be used.

The reinforcing fibers used in the present embodiment may be treated with a treatment agent. Examples of the treatment agent include a surface treatment agent or a sizing agent.

A silane coupling agent is preferable as the surface treatment agent. Examples of the silane coupling agent include a silane coupling agent having a vinyl group, a silane coupling agent having an amino group, a silane coupling agent having an epoxy group, a silane coupling agent having a (meth)acrylic group, and a silane coupling agent having a mercapto group.

Examples of the sizing agent include a urethane-based sizing agent, an epoxy-based sizing agent, an acrylic-based sizing agent, a polyester-based sizing agent, a vinyl ester-based sizing agent, a polyolefin-based sizing agent, a polyether-based sizing agent, and a carboxylic acid-based sizing agent, and of these, one type of sizing agent can be used, or two or more types of the sizing agents can be used in combination. Examples of combinations of two or more sizing agents include urethane/epoxy-based sizing agents, urethane/acrylic-based sizing agents, and urethane/carboxylic acid-based sizing agents.

Among these, from the viewpoint of improving interfacial adhesiveness to the elastomer, the reinforcing fibers are preferably treated with one or more types of sizing agents selected from the group consisting of urethane-based sizing agents, epoxy-based sizing agents, and urethane/epoxy-based sizing agents, and are more preferably treated with an epoxy-based sizing agent.

The amount of the treatment agent is preferably from 0.001 to 5 mass %, more preferably from 0.1 to 3 mass %, and even more preferably from 0.5 to 2 mass %, relative to the amount of the reinforcing fibers.

Commercially available products can be also used as the reinforcing fibers. Examples of commercially available products of carbon fibers that are reinforcing fibers include Torayca fibers of the series "T300", "T300B", "T400HB", "T700SC". "T800SC", "T800HB", "T830HB", "T1000 GB", "T100GC", "M35JB", "M40JB", "M46JB", "M50JB", "M55J", "M55JB", "M60JB", "M30SC", and "Z600", and Torayca Cloth of the series "CO6142". "CO6151B", "CO6343", "CO6343B". "CO6347B", "CO6644B", "CK6244C", "CK6273C", and "CK6261C", the "UT70" series, the "UM46" series, and the "BT70" series, available from Toray Industries, Inc.

From the viewpoint of achieving effect of the present embodiment, in the strand of the present embodiment, the proportion of the reinforcing fibers is preferably 10 mass % or greater, more preferably 20 mass % or greater, and even more preferably 30 mass % or greater, and the upper limit is 70 mass % or less, and more preferably 60 mass % or less.

The elastomer used in the present embodiment may be a thermosetting elastomer or a thermoplastic elastomer, and is preferably a thermosetting elastomer. By using the thermosetting elastomer, voids are less likely to occur during production of the strand, and a strand that can better withstand frictional heat during use of the strand can be obtained. Examples of the elastomer used in the present embodiment include an elastomer containing an epoxy unit, an elastomer containing a styrene unit, an elastomer containing a (meth) acryloyl group unit, an elastomer containing a cyanate unit, an elastomer containing an acid anhydride unit, an elastomer containing a hydroxyl group unit, an elastomer containing a carboxyl group, and an elastomer containing an amine unit, and an elastomer containing a styrene unit is preferred.

The elastomer containing a styrene unit is preferably a styrene-butadiene elastomer containing a styrene unit and a butadiene unit. The elastomer containing a styrene unit is preferably a water-based elastomer. The styrene-butadiene elastomer preferably has a basic unit structure in which a polystyrene part (hard segment) and a polybutadiene part imparting a property for softness (soft segment) are block-copolymerized. The terminal blocks of the polystyrene aggregate each other to form ultrafine particles, and the ultrafine particles disperse uniformly and serve a role corresponding to crosslinking points of a crosslinked rubber, and thus characteristics as an elastic body having a three-dimensional network structure are achieved. Furthermore, by eliminating an unsaturated double bond by subjecting the butadiene part to hydrogenation, it is possible to impart excellent thermal resistance and weather resistance. The mass ratio of the styrene to the butadiene is preferably from 10:100 to 50:100, more preferably from 20:100 to 40:100, and particularly preferably from 25:100 to 35:100.

The elastic modulus of the elastomer used in the present embodiment is an elastic modulus A measured in accordance with JIS K 7161:2019 after the elastomer is heated at a curing temperature of the elastomer for 2 hours and then subjected to temperature and humidity adjustment at 23° C., and a relative humidity of 55% for 2 weeks. The elastic modulus A is preferably 0.05 MPa or more, more preferably 0.1 MPa or more, and even more preferably 1 MPa or more. When the elastic modulus A is not less than the lower limit, tensile strength of the strand tends to be further improved. Furthermore, the elastic modulus A is preferably 30 MPa or less, more preferably 24 MPa or less, and even more preferably 10 MPa or less. When the elastic modulus A is not higher than the upper limit value, flexibility of the strand in a curving direction tends to be further improved.

When the core material contains two or more types of elastomers, the elastic modulus A is an elastic modulus of a cured product of the mixture. Furthermore, in a case where the elastomer contains another component described below, the elastic modulus is an elastic modulus of a cured product of the mixture including such another component.

The elastomer in the present embodiment may contain another component within a range that does not depart from the spirit of the present invention. Specific examples of such another component that may be contained in the elastomer include an additive such as a coupling agent, a reactive diluent, a solvent, a curing accelerator, a humectant, a tackifier, an antifoaming agent, a delustering agent, an anticorrosive, a lubricant, a coloring agent, an oxygen scavenger, a UV absorber, an antioxidant, a plasticizer, a dispersing agent, a flame retarder, an antistatic agent, a coloration inhibitor, and an antigelling agent. The total amount of these is preferably 10 mass % or less of the elastomer component.

The content of the elastomer in the core material is preferably 20 parts by mass or higher, and more preferably 30 parts by mass or higher, with respect to 100 parts by mass of the reinforcing fibers. When the content of the elastomer in the core material is not less than the lower limit, tensile strength of the strand tends to be further improved. Furthermore, the content of the elastomer in the core material is preferably 80 parts by mass or less, and more preferably 70 parts by mass or less, with respect to 100 parts by mass of the reinforcing fibers. When the content of the elastomer in the core material is not higher than the upper limit value, single yarn breakage of the reinforcing fibers tends to be effectively suppressed.

The strand in the present embodiment may contain only one type of the elastomer or may contain two or more types of the elastomers. When two or more types are contained, the total amount thereof is preferably in the above range.

In the core material in the present embodiment, the reinforcing fiber is preferably covered by a yarn containing a polyester resin. Covering means winding yarn for covering in a coil form around a reinforcing fiber serving as a core. By covering, a cross-section of the reinforcing fiber can be made substantially circular, and functions as the strand tends to be more effectively exhibited. The winding angle can be appropriately set in a range of ±30 to 90° in a fiber length direction of the reinforcing fiber.

In the present embodiment, a yarn containing a polyester resin may cover a reinforcing fiber bundle impregnated with an elastomer, or impregnation with an elastomer may be performed after the yarn containing a polyester resin has covered a reinforcing fiber bundle. Preferably, impregnation with an elastomer is performed after the yarn containing a polyester resin has covered a reinforcing fiber bundle.

A melting point of the polyester resin is preferably higher than a melting point of the thermoplastic resin contained in the covering layer composition. With such a configuration, the strand can be appropriately produced even when, after the core material is formed, a covering layer composition in a molten state is extruded onto a surface of the core material, without affecting the core material.

The covering may be only covering in one direction (S-winding) or may be a covering in two directions (SZ-winding). Covering in two directions can make the cross-section of the reinforcing fiber substantially circular.

The melting point of the thermoplastic resin in the present embodiment is measured by the following measurement method.

To measure the melting point of the thermoplastic resin, a differential scanning calorimeter (DSC) is used to determine the melting point from a temperature at which the observed endothermic peak reached a maximum peak when approximately 1 mg of a sample is heated and melted from room temperature to a temperature equal to or higher than the anticipated melting point at a temperature increase rate of 10° C./min while nitrogen is streamed at 30 mL/min as an atmosphere gas.

As the differential scanning calorimeter (DSC), the DSC-60, available from Shimadzu Corporation, can be used.

The yarn containing a polyester resin is preferably 10 d or more, more preferably 80 d or more, and even more preferably 100 d or more, and preferably 1000 d or less, more preferably 500 d or less, and even more preferably 300 d or less. Furthermore, the yarn containing a polyester resin is preferably a polyester resin fiber bundle, and the number of filaments thereof is preferably 10 f or more, and preferably 100 f or less.

The yarn containing a polyester resin may be twisted, and the number of twists is not limited but the yarn is preferably twisted at 10 T/m or more, and more preferably 20 T/m or more. Furthermore, the yarn is preferably twisted 200 T/m or less, and more preferably 100 T/m or less.

In the yarn containing a polyester resin, 90 mass % or greater is preferably a polyester resin. The yarn containing the polyester resin in the present embodiment preferably has a higher elastic modulus than the elastic modulus of the resin contained in the covering layer, and more preferably has an elastic modulus higher by 10 to 100 MPa. With such a configuration, a gap between the covering layer and the reinforcing fiber tends to be effectively suppressed.

When the core material is covered by the yarn containing a polyester resin, the mass proportion of the yarn containing a polyester resin is preferably 1 mass % or greater, and more preferably 2 mass % or greater, and preferably 30 mass % or less, and more preferably 10 mass % or less, of the core material.

Furthermore, in the present embodiment, the cross-section of the reinforcing fiber can be made close to circular without the covering but by employing twisted yarn as a reinforcing fiber or by applying a high tension during covering, and thus the functions as the strand can be improved.

The number average diameter of the core material is preferably 300 μm or more, more preferably 500 μm or more, even more preferably 700 μm or more, yet even more preferably 800 μm or more, and yet even more preferably 900 μm or more. When the number average diameter of the core material is not lower than the lower limit value, the dimension of the covering layer tends to be stable. The number average diameter of the core material is also preferably 2000 μm or less, more preferably 1600 μm or less, even more preferably 1400 μm or less, yet even more preferably 1200 μm or less, and yet even more preferably 1000 μm or less. When the number average diameter of the core material is not higher than the upper limit value, flexibility tends to be more effectively maintained.

The length of the core material is typically 1 cm or more, preferably 5 cm or more, more preferably 50 cm or more, and even more preferably 1 m or more. However, in a case where the strand is assembled into a driving part, and in an actual usage form, the core material may be cut into a desired length properly or may be properly allowed to have a longer length by twisting and the like.

The strand of the present embodiment includes a covering layer containing a thermoplastic resin. The covering layer is a layer that partially or entirely covers the core material. Typically, 80% or greater, preferably 90% or greater, more preferably 95% or greater, and even more preferably 98% or greater, of the surface area of the core material is covered by the covering layer. When the covering layer is provided, slidability tends to be superior. In the core material, when the reinforcing fiber is covered by the yarn containing a polyester resin, the covering layer is provided on the outer side of the yarn to be covered.

The covering layer is typically made of a covering layer composition. The covering layer composition may consist only of a thermoplastic resin, or may contain a thermoplastic resin and a filler material or may further contain an additional additive.

In the present embodiment, an elastic modulus B measured in accordance with JIS K 7161:2019 after an ISO test piece having a thickness of 4 mm made of a covering layer composition constituting the covering layer is dried at 120° C. for 1 hour is preferably 500 MPa or more, more preferably 1000 MPa or more, even more preferably 1500 MPa or more, yet even more preferably 2000 MPa or more, yet even more preferably 2500 MPa or more, and yet even more preferably 3450 MPa or more. When the elastic modulus B is not lower than the lower limit value, slidability tends to be improved. Furthermore, for the upper limit value of the elastic modulus B, 6000 MPa or less is practical.

The thermoplastic resin contained in the covering layer may be a crystalline thermoplastic resin or an amorphous thermoplastic resin, and is preferably a crystalline thermoplastic resin. Use of the crystalline thermoplastic resin tends to further improve slidability with respect to other member of the resulting strand.

When the thermoplastic resin contained in the covering layer is a crystalline thermoplastic resin, from the viewpoint of thermal resistance, a melting point measured by using a differential scanning calorimeter (DSC) described in detail below is preferably 100° C. or higher. Furthermore, the upper limit of the melting point is, for example, 350° C., or lower.

Specific examples of the thermoplastic resin contained in the covering layer include a polyamide resin, a polycarbonate resin, a polyolefin resin, a polyester resin, a polyacetal resin, a polyimide resin, and a polyether ether ketone resin, and a polyamide resin is preferred.

The polyamide resin may be an aliphatic polyamide resin or a semi-aromatic polyamide resin, and may contain both. In the present embodiment, a semi-aromatic polyamide resin is preferably contained, and a xylylenediamine-based polyamide resin described below is more preferred.

Examples of the aliphatic polyamide resin include polyamides 6, 11, 12, 46, 66, 610, 612, 6/66, poly bis(4-aminocyclohexyl)methane dodecamide, poly bis(3-methyl-4-aminocyclohexyl)methane dodecamide, and polyisophorone adipamide.

The semi-aromatic polyamide resin refers to a polyamide resin constituted from a structural unit derived from a diamine and a constituent unit derived from a dicarboxylic acid, and from 20 to 80 mol % (preferably from 30 to 70 mol %) of the total structural units of the structural units derived from a diamine and the structural units derived from a dicarboxylic acid are structural units containing an aromatic ring. By using such a semi-aromatic polyamide resin, the mechanical strength of the resulting strand can be increased. Examples of the semi-aromatic polyamide resin include polyamides 6I, 6T, 6T/6I, 6/6T, 66/6T, 66/6T/6I, 9T, 10T, a xylylenediamine-based polyamide resin, polytrimethyl hexamethylene terephthalamide, and polyundecamethylene hexahydroterephthalamide. "I" described above denotes an isophthalic acid component, and "T" a terephthalic acid component.

The xylylenediamine-based polyamide resin is a polyamide resin containing diamine-derived structural units and dicarboxylic acid-derived structural units, and 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms.

As the xylylenediamine, m-xylylenediamine and p-xylylenediamine can be used. In the present embodiment, the xylylenediamine is preferably only m-xylylenediamine or a mixture (copolymer) of m-xylylenediamine and p-xylylenediamine.

In the xylylenediamine, the ratio of m-xylylenediamine to p-xylylenediamine is preferably from 100:0 to 10:90, and may be from 100:0 to 30:70, from 100:0 to 60:40, or from 100:0 to 90:10.

In the diamine-derived structural units in the xylylenediamine-based polyamide resin, preferably 80 mol % or greater, more preferably 85 mol % or greater, even more preferably 90 mol % or greater, yet even more preferably 95 mol % or greater, yet even more preferably 97 mol % or greater, and yet even more preferably 99 mol % or greater, is derived from xylylenediamine. In the dicarboxylic acid-derived structural units in the xylylenediamine-based polyamide resin, preferably 80 mol % or greater, more preferably 85 mol % or greater, even more preferably 90 mol % or greater, yet even more preferably 95 mol % or greater, yet even more preferably 97 mol % or greater, and yet even more preferably 99 mol % or greater, is derived from a, co-linear aliphatic dicarboxylic acid having from 4 to 20 carbon atoms (preferably sebacic acid).

Examples of diamines, besides xylylenediamine, that can be used as raw material diamine components of the xylylenediamine-based polyamide resin include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl) cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, and bis(aminomethyl)naphthalene. One type thereof can be used, or two or more types thereof can be mixed and used.

Examples of the α,ω-linear aliphatic dicarboxylic acid having from 4 to 20 carbon atoms that is preferably used as the raw material dicarboxylic acid component of the xylylenediamine-based polyamide resin include an aliphatic dicarboxylic acid, such as succinic acid, glutaric acid, pimelic acid, suberic acid, azelaic acid, adipic acid, sebacic acid, undecanedioic acid, and dodecanedioic acid, One type thereof can be used, or two or more types thereof can be mixed and used. Among these, adipic acid or sebacic acid is more preferred, and sebacic acid is even more preferred.

Examples of dicarboxylic acid components other than the α,ω-linear aliphatic dicarboxylic acid having from 4 to 20 carbons include a phthalic acid compound, such as isophthalic acid, terephthalic acid, and ortho-phthalic acid; and naphthalenedicarboxylic acid, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, One of these can be used alone, or two or more types can be mixed and used.

The xylylenediamine-based polyamide resin used in the present embodiment contains diamine-derived structural units and dicarboxylic acid-derived structural units as main components, but a case where a structural unit other than these is contained is not excluded, and of course, the xylylenediamine-based polyamide resin may contain a structural unit derived from a lactam such as ε-caprolactam or laurolactam, or from an aliphatic aminocarboxylic acid such as aminocaproic acid or aminoundecanoic acid. Here, the term "main component" indicates that, of the structural units constituting the xylylenediamine-based polyamide resin, the total number of the diamine-derived structural units and the dicarboxylic acid-derived structural units is the largest among all the structural units. In the present embodiment, the total of the diamine-derived structural units and the dicarboxylic acid-derived structural units in the xylylenediamine-based polyamide resin preferably accounts for 90.0 mass % or greater, and more preferably 95.0 mass % or greater, of all the structural units.

The content of the thermoplastic resin (preferably a polyamide resin) in the covering layer and the covering layer composition is preferably 30 mass % or greater, more preferably 40 mass % or greater, and even more preferably 50 mass % or greater. When the content of the thermoplastic resin is not lower than the lower limit value, superior slidability tends to be achieved. Furthermore, the content of the thermoplastic resin (preferably a polyamide resin) in the covering layer and the covering layer composition is preferably 99 mass % or less, more preferably 95 mass % or less, and even more preferably 91 mass % or less. When the content of the thermoplastic resin is not higher than the upper limit value, excellent low frictional property tends to be achieved.

The covering layer and the covering layer composition may contain only one type of thermoplastic resin or two or more types of thermoplastic resins. When two or more types are contained, the total amount thereof is preferably in the above range.

In the present embodiment, the covering layer and the covering layer composition may contain a filler material. When the filler material is contained, the slidability of the resulting strand can be further improved.

The filler material in the present embodiment is preferably a whisker or granular filler material.

The filler material in the present embodiment preferably is a filler material having an aspect ratio (long side/short side) of 10 or greater. When such a filler material is extruded while being wound during production, the filler material is pulled in a continuous direction and tends to orient in a fixed direction. As a result, strength of the resulting strand is improved, and slidability also tends to be improved. The aspect ratio is preferably 15 or greater, and more preferably 20 or greater, and preferably 50 or less, and more preferably 40 or less. When the aspect ratio is in such a range, strength and appearance of the resulting strand can be further improved.

The number average fiber length of the filler material is preferably from 5 to 200 μm, and more preferably from 5 to 150 μm, and may be from 5 to 30 μm. The number average fiber size of the filler material is preferably from 0.1 to 20 μm, and more preferably from 0.3 to 15 μm, and may be from 0.3 to 0.8 μm.

In the present embodiment, as the filler material having an aspect ratio (long side/short side) of 10 or greater, whiskers can be used. Whiskers are fibrous or needle-like short inorganic crystals.

The number average fiber length and the number average fiber size of the whiskers can be measured by observation in a condition where the whiskers are dispersed in a solvent such as alcohol, using an electron microscope. Typically, an average value of 100 whiskers is used.

The whiskers have a Mohs scale of hardness of preferably from 2.5 to 5.0, and more preferably from 3.0 to 4.8. When the Mohs scale of hardness is in such a range, wear in a barrel or a screw in an extruder can be reduced, and stable extrusion can be performed.

The specific gravity of the whiskers is preferably from 2.0 to 4.0, and more preferably from 2.2 to 3.8. When the whiskers having the specific gravity in such a range are used, volume ratio in the strand can be made small.

Examples of the raw material of the filler material (preferably whiskers) include zinc oxide, potassium titanate, aluminum borate, silicon carbide, silicon nitride, magnesium oxide, magnesium borate, basic magnesium sulfate, titanium diboride, graphite, calcium sulfate, α-alumina, chrysotile, wollastonite, aluminum silicate, calcium silicate, titanium oxide, and zirconium oxide. In the present embodiment, wollastonite and/or potassium titanate is preferred, and potassium titanate is more preferred.

The whiskers used in the present embodiment may have undergone a known surface treatment (e.g., surface treatment by a surface treatment agent such as a metal oxide, a silane coupling agent, a titanium coupling agent, an organic acid, a polyol, or a silicone). When such a surface treatment is performed, miscibility and/or dispersibility of the resin composition of the present embodiment with other component may be improved.

As the whiskers, a commercially available product can be also used. Examples of the commercially available product include product names "Pana-tetra WZ-0501", "Pana-tetra WZ-0501L", "Pana-tetra WZ-0511", "Pana-tetra WZ-0511L", "Pana-tetra WZ-0531", "Pana-tetra WZ-05E1", and "Pana-tetra WZ-05F1" (these are zinc oxide whiskers, available from Amtec Co., Ltd.); product names "FTL-100", "FTL-110", "FTL-200", and "FTL-300" (these are titanium oxide whiskers, available from Ishihara Sangyo Kaisha, Ltd.); and product name "TOFIX-P" (titanium oxide whiskers, available from Toho Titanium Co., Ltd.).

The content of the filler material (preferably a filler material having an aspect ratio (long side/short side) of 10 or greater) in the covering layer and the covering layer composition of the present embodiment is preferably 0.1 parts by mass or higher, more preferably 5 parts by mass or higher, and even more preferably 10 parts by mass or higher, with respect to 100 parts by mass of the thermoplastic resin. The content of the filler material may be 20 parts by mass or higher. When the content of the filler material is not lower than the lower limit value, slidability tends to be further improved. The content of the filler material (preferably a filler material having an aspect ratio (long side/short side) of 10 or greater) in the covering layer and the covering layer composition of the present embodiment is also preferably 100 parts by mass or less, more preferably 50 parts by mass or less, even more preferably 40 parts by mass or less, and yet even more preferably 30 parts by mass or less, with respect to 100 parts by mass of the thermoplastic resin. When the content of the filler material is not higher than the upper limit value, toughness tends to be further improved.

The resin composition of the present embodiment may contain only a single type of filler material (preferably a filler material having an aspect ratio (long side/short side) of 10 or greater), or may contain two or more types of filler materials. When two or more types are contained, the total amount thereof is preferably in the above range.

The thickness of the covering layer is preferably 20 μm or more, more preferably 50 μm or more, even more preferably 80 μm or more, yet even more preferably 100 μm or more, and yet even more preferably 120 μm or more. When the thickness of the covering layer is not lower than the lower limit value, slidability tends to be further improved. The thickness of the covering layer is preferably 2000 μm or less, more preferably 1000 μm or less, even more preferably 700 μm or less, yet even more preferably 500 μm or less, and yet even more preferably 400 μm or less, and may be 300 μm or less. When the thickness of the covering layer is not higher than the upper limit value, flexibility tends to be further improved.

The strand of the present embodiment includes the core material and the covering layer, and may contain another layer. Examples of such another layer include metal foil and an oil film.

In the strand of the present embodiment, the core material and the covering layer are preferably 90 mass % or greater, and more preferably 95 mass % or greater, of the strand.

In the present embodiment, the cross-sectional ratio of the covering layer to the core material is preferably 0.1 or greater, more preferably 0.2 or greater, even more preferably 0.24 or greater, yet even more preferably 0.28 or greater, and yet even more preferably 0.32 or greater, when the area of the cross-section of the core material is 1. When the cross-sectional ratio is not lower than the lower limit value, damage to the reinforcing fiber can be further effectively suppressed. Furthermore, the cross-sectional ratio of the covering layer to the core material is preferably 3 or less, more preferably 2 or less, even more preferably 1.7 or less, yet even more preferably 1.4 or less, and yet even more preferably 1 or less, when the area of the cross-section of the core material is 1. When the cross-sectional ratio is not higher than the upper limit value, superior flexibility tends to be achieved.

In the present embodiment, an elastic modulus A and an elastic modulus B preferably satisfy (the elastic modulus A/the elastic modulus B)<0.00500, where the elastic modulus A is measured in accordance with JIS K 7161:2019 after the elastomer is heated at a curing temperature of the elastomer for 2 hours and then subjected to temperature and humidity adjustment at 23° C., and a relative humidity of 55% for 2 weeks, and the elastic modulus B is measured in accordance with JIS K 7161:2019 after an ISO test piece having a thickness of 4 mm made of a covering layer composition constituting the covering layer is dried at 120° C. for 1 hour. With such a configuration, flexibility is imparted to the strand, and when the strand is used in a driving mechanism, winding and unwinding are further facilitated. The elastic modulus A/the elastic modulus B is preferably 0.00400 or less, more preferably 0.00200 or less, even more preferably 0.00150 or less, yet even more preferably 0.00090 or less, and yet even more preferably 0.00057 or less. The lower limit value of the elastic modulus A/the elastic modulus B is preferably 0.00040 or greater.

The diameter (number average diameter) of the strand of the present embodiment is preferably 500 μm or more, more preferably 750 μm or more, and even more preferably 1000 μm or more. When the diameter of the strand is not lower than the lower limit value, strength that enables the strand to be used in a wider purpose can be effectively exhibited. Furthermore, the diameter of the strand of the present embodiment is preferably 10000 μm or less, more preferably 8000 μm or less, and even more preferably 6000 μm or less. When the diameter of the strand is not higher than the upper limit value, flexibility tends to be further improved.

In a case where the cross-section of the strand is not circular, the diameter means a diameter in a case where the cross-section is converted into a circle having the identical area.

The strand of the present embodiment preferably has a cross-section that is substantially circular. "Substantially circular" means that a ratio of a length of the major axis to a length of the minor axis of the cross-section is from 0.8 to 1.2. Thus, for example, the strand is preferably not in a sheet shape. In the present embodiment, covering by yarn containing a polyester resin can make the cross-section substantially circular as described above.

The length (number average length) of the strand of the present embodiment is preferably 5 cm or more, more preferably 1 m or more, and even more preferably 100 m or more, and preferably 10000 m or less.

The method for producing a strand is not particularly limited, and a known production method can be used. An example of the method for producing a strand is a method including forming a covering layer by extruding a covering layer composition containing a thermoplastic resin on an outer side of a core material containing a reinforcing fiber impregnated with an elastomer.

Furthermore, in a case where the reinforcing fiber is covered by yarn containing the polyester resin, the melting point of the polyester resin is preferably higher than the melting point of the thermoplastic resin contained in the covering layer composition, and is preferably higher by 10 to 100° C. With such a configuration, the strand can be appropriately produced even when, after the core material is formed, a covering layer composition in a molten state is extruded onto a surface of the core material, without affecting the core material.

In an actual usage form, one strand of the present embodiment including a core material containing a reinforcing fiber impregnated with an elastomer and a covering layer containing a thermoplastic resin may be used as is, or a bundle of multiple strands of the present embodiment may be used.

In a case where multiple strands are combined, the combined strands are preferably used as twisted yarn, braid, and the like of the strands. In a case where multiple strands are combined, the material constituting each of the strands may be identical or different.

By bundling or twisting the multiple strands, strength can be increased while flexibility is maintained.

Driving Part

Next, a driving part of the present embodiment will be described. The driving part of the present embodiment is a driving part including: a first member including the strand of the present embodiment, and a second member being in contact with the strand of the first member and containing a thermoplastic resin. Because the strand of the present embodiment has excellent slidability, the strand can be preferably used in a driving part. In particular, by using a member containing a thermoplastic resin also in the second member which is the other member, even in a condition where the strand of the present embodiment and the second member slide, stability can be expected. An example of such a driving part is a driving part described in Patent Document 3.

Examples of the thermoplastic resin contained in the second member include a polyamide resin, a polycarbonate resin, a polyolefin resin (preferably a polyethylene resin), a polyolefin resin, a polyester resin, a polyacetal resin, a polyimide resin, and a polyether ether ketone resin. A polyamide resin is preferred, and a xylylenediamine-based polyamide resin is more preferred.

The xylylenediamine-based polyamide resin is a polyamide resin containing diamine-derived structural units and dicarboxylic acid-derived structural units, and 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms. The details of the xylylenediamine-based polyamide resin are synonymous with those described for the covering layer, and preferred ranges are also the same.

The second member may contain a filler material in addition to the thermoplastic resin, and preferably contains a filler material having an aspect ratio (long side/short side) of 10 or greater. The details of the filler material and the filler material having an aspect ratio (long side/short side) of 10 or greater are synonymous with those described for the covering laver, and preferred ranges are also the same.

By blending the filler material, a driving part in which the second member has excellent slidability and which has superior slidability can be obtained.

In addition to the thermoplastic resin and the filler material, the second member may contain other components within a range that does not depart from the spirit of the present invention. The details of such other components are synonymous with those described for the covering layer, and preferred ranges are also the same.

The proportion of the thermoplastic resin (preferably a polyamide resin, and more preferably a xylylenediamine-based polyamide resin) in the second member is preferably 30 mass % or greater, more preferably 40 mass % or greater, and even more preferably 50 mass % or greater. When the proportion is not lower than the lower limit value, damage to the strand tends to be further effectively reduced. Furthermore, the content of the thermoplastic resin is preferably 97 mass % or less, more preferably 95 mass % or less, and even more preferably 92 mass % or less. When the content of the thermoplastic resin is not higher than the upper limit value, the strand achieves superior slidability.

In the present embodiment, the second member may contain a single type of thermoplastic resin, or may contain two or more types of thermoplastic resins. When two or more types are contained, the total amount thereof is preferably in the above range.

In the second member, the proportion of the filler material (preferably potassium titanate whiskers) is preferably 3 parts by mass or higher, and may be 5 parts by mass or higher, with respect to 100 parts by mass of the thermoplastic resin. When the proportion of the filler material is not lower than the lower limit value, superior slidability tends to be achieved. The proportion of the filler material (preferably potassium titanate whiskers) is preferably 50 parts by mass or less, and more preferably 40 parts by mass or less, and may be 30 parts by mass or less or 25 parts by mass or less, with respect to 100 parts by mass of the thermoplastic resin. When the proportion of the filler material is not higher than the upper limit value, covering processing tends to be stable.

In the present embodiment, the second member may contain a single type of filler material, or may contain two or more types of filler materials. When two or more types are contained, the total amount thereof is preferably in the above range.

The proportion of another component (proportion of component other than the thermoplastic resin and the filler material) in the second member is, in a case where such a component is included, preferably from 0 to 10 mass %, and more preferably from 0 to 5 mass %.

In the present embodiment, the second member may contain a single type of such another component, or may contain two or more types of such other components. When two or more types are contained, the total amount thereof is preferably in the above range.

In the present embodiment, an example of a second member of a preferred embodiment is an embodiment where the second member contains a polyamide resin and a filler material having an aspect ratio (long side/short side) of 10 or greater. More preferably, in the embodiment, the polyamide resin contains a xylylenediamine-based polyamide resin and potassium titanate whiskers.

In the present embodiment, for the first member and the second member, preferably 70 mass % or greater, more preferably 75 mass % or greater, even more preferably 80 mass % or greater, yet even more preferably 85 mass %, yet even more preferably 90 mass %, and yet even more preferably 95 mass %, are common between a composition of a covering layer (covering layer composition) of the strand and a composition of the second member (second member composition). Note that "common between compositions" means that resin components use a common raw material monomer. For example, when 70 mass % or greater are identical between raw material monomers of a resin contained in the first member and raw material monomers of a resin contained in the second member, it can be said that 70 mass % or greater of both of the resins are common.

In particular, when both of the covering layer composition and the second member composition contain a xylylenediamine-based polyamide resin and potassium titanate whiskers, a driving part having remarkably excellent slidability can be obtained.

In the driving part of the present embodiment, an elastic modulus B and an elastic modulus C preferably satisfy 0.5≤(the elastic modulus B/the elastic modulus C)≤2.0, where the elastic modulus B is measured in accordance with JIS K 7161:2019 after an ISO test piece having a thickness of 4 mm made of a covering layer composition constituting the covering layer of the first member is dried at 120° C. for 1 hour, and the elastic modulus C is measured in accordance with JIS K 7161.2019 after an ISO test piece having a thickness of 4 mm made of a second member composition constituting the second member is dried at 120° C. for 1 hour. When this relationship between the moduli of elasticity is satisfied, flexibility and protective performance of the strand can be effectively provided in a compatible manner.

The elastic modulus B/the elastic modulus C is preferably 0.7 or greater, and more preferably 0.8 or greater, and preferably 1.5 or less, and more preferably 1.2 or less.

Furthermore, an elastic modulus C measured in accordance with JIS K 7161:2019 after an ISO test piece having a thickness of 4 mm made of a second member composition is dried at 120° C. for 1 hour is preferably 500 MPa or more, more preferably 1000 MPa or more, even more preferably 1500 MPa or more, yet even more preferably 2000 MPa or more, yet even more preferably 2500 MPa or more, and yet even more preferably 3450 MPa or more. When the elastic modulus C is not lower than the lower limit value, damage to the core material tends to be effectively prevented. Furthermore, for the upper limit value of the elastic modulus C, 6000 MPa or less is practical.

The method for producing the second member is not particularly limited, and a known molding method of a thermoplastic resin, such as injection molding and 3D printer, can be employed.

Furthermore, the driving part of the present embodiment has excellent lightweight property.

The driving part of the present embodiment may contain a metal but may have a constitution substantially free of metals. Thus, the driving part having excellent lightweight property can be obtained. "Substantially free of metals" means that the metal content of the first member and the second member in the driving part of the present embodiment is 3 mass % or less, and the metal content is preferably 1 mass % or less. In particular, the first member is preferably substantially free of metals.

Examples of fields of application of the driving part of the present embodiment include various fields that use driving mechanisms.

In particular, weight reduction is desired in use for a driving mechanism such as an elevator, a medical robot, and an industrial robot. By using the strand and/or the driving part of the present embodiment, it is possible to achieve weight reduction in addition to slidability.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

If a measuring device used in the examples is not readily available due to discontinuation or the like, another device with equivalent performance can be used for measurement.

1. Raw Material

Core material 1: Polyester fiber-covered carbon fiber wire (wire in which polyester fiber covers carbon fiber), available from Kajirene Inc.; carbon fiber: 8000 dtex (/12000 f); the melting point of the polyester fiber is 260° C.

Core material 2: Polyester fiber-covered aramid fiber wire (wire in which aramid fiber covers carbon fiber), available from Kajirene Inc.; aramid fiber: 7500 dtex (three 2500 dtex); the melting point of the polyester fiber is 260° C.

Styrene-butadiene elastomer: Water-based elastomer, SR-100, available from Nippon A&L Inc.; elastic modulus: 2 MPa Epoxy elastomer: A-8511WLC, available from Resinous Corporation; elastic modulus: 25 MPa Whiskers: Potassium titanate whiskers, TISMO D-101, available from Otsuka Chemical Co., Ltd.; aspect ratio of 30; number average fiber length of 15 μm; number average fiber size of 0.5 μm; Mohs scale of hardness of 4.0; specific gravity of 3.5

Titanium oxide particles: available from Kanto Chemical Co., Inc.; aspect ratio of 1; number average particle size of 2 to 4 μm MXD10: Resin synthesized using m-xylylenediamine synthesized in the following Synthesis Example and sebacic acid. The melting point of MXD10 is 190° C.

PE: Polyethylene resin, HY420, available from Japan Polyethylene Corporation: the melting point of the polyethylene resin is 133° C.

Whiskers+MXD10: MXD10 containing 10 mass % of potassium titanate whiskers

Elastomer Infiltration Method

A polyester fiber-covered carbon fiber wire and an elastomer-impregnated polyester fiber-covered aramid fiber wire were soaked in an elastomer solution for 10 seconds and then cured at 120° C. for 1 hour, and thus elastomer-impregnated wires were obtained.

Synthesis of MXD10

In a jacketed reactor equipped with an agitator, a partial condenser, a cooler, a thermometer, a dripping tank, and a nitrogen gas introduction tube, sebacic acid (available from CASDA) was placed, inside of the reactor was sufficiently purged with nitrogen, and the sebacic acid was heated and melted at 170° C. Then, while the contents were agitated and while m-xylylenediamine (MXDA, available from Mitsubishi Gas Chemical Company, Inc.) was gradually added dropwise in a manner that the molar ratio of the m-xylylenediamine to the sebacic acid became 1:1, the temperature was increased to 240° C. After the completion of dropwise addition, the temperature was increased to 260° C., and the reaction was continued for 20 minutes. Thereafter, the internal pressure of the reaction system was continuously reduced to 0.08 MPa, and then the reaction was continued. After completion of the reaction, by application of a pressure of 0.2 MPa using a nitrogen gas in the reactor, the polymer was taken out as a strand from a nozzle at a bottom part of the polymerization tank and cooled with water. Then, pellets were obtained by using a pelletizer.

2. Measurement Method

Method for Measuring Elastic Modulus

The elastomer elastic modulus was determined by heating the elastomer at the curing temperature of the elastomer for 2 hours, subsequently subjecting the elastomer to temperature and humidity adjustment for two weeks under a condition at 23° C., and a relative humidity of 55%, then cutting the elastomer into an ISO test piece size, and then performing a measurement in accordance with JIS K 7161:2019.

Note that the curing temperature is a temperature at which curing starts.

For the elastic modulus of the covering layer composition and the second member composition, a 4 mm thick ISO test piece made of the thermoplastic resin was dried at 120° C. for 1 hour, after which the elastic modulus was measured in accordance with JIS K. 7161:2019.

The elastic modulus was expressed in units of MPa.

Damage to Strand Wire and Damage to Target Object for Friction

As the target object for abrasion, an injection molded product obtained by molding the raw materials listed in Tables 1 to 4 into 80 mm×10 mm×4 mm thickness was used. Furthermore, in a case where the target object for abrasion was SUS304, edges of the plate was trimmed in a manner that r was 0.021 mm.

Figure 3:
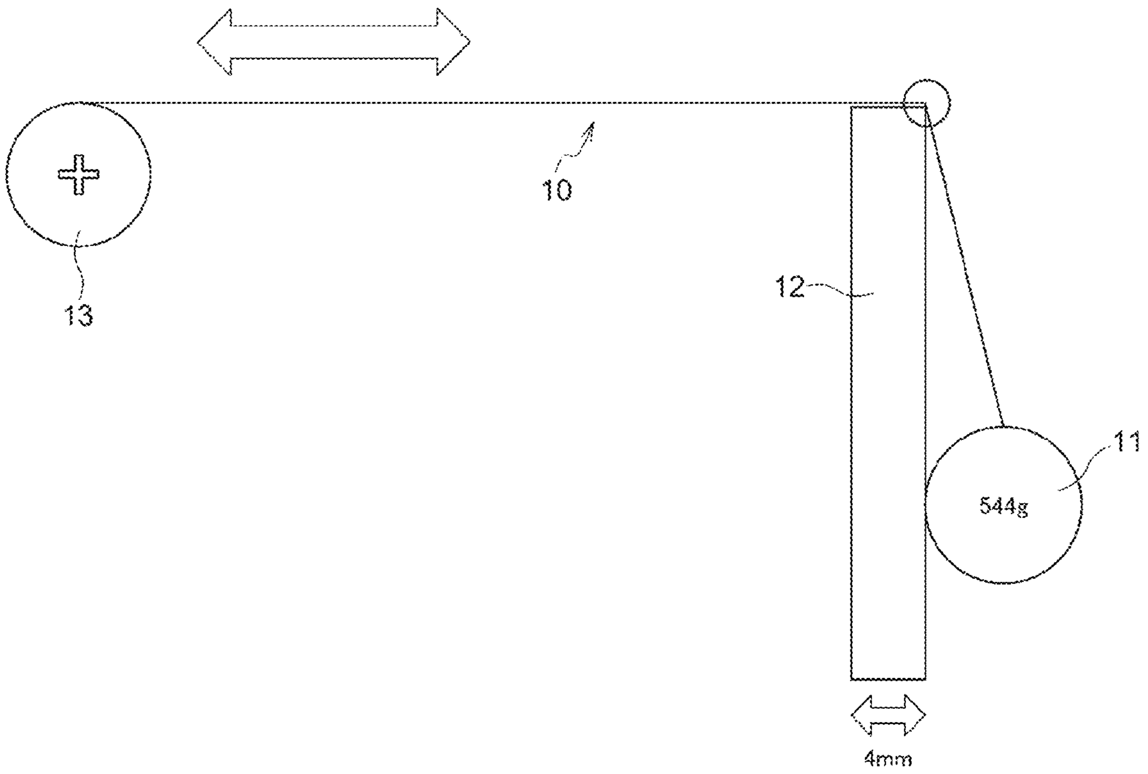
FIG. 3 is a schematic view illustrating a measurement method of slidability of the strand on a target object in Examples.

As illustrated in FIG. 3, at an end of a strand 10, a 544 g iron ball 11 was fixed and then a motor 13 was operated to allow the iron ball 11 to rub a target object for abrasion 12 as illustrated in FIG. 3. In FIG. 3, a distance of movement of the strand was 10 cm, and a speed of movement was 10 cm/sec. Decision was made as follows based on the condition of a part indicated by a circle mark in FIG. 3 after the rubbing was performed up and down for 10 times and 50 times.

Five experts conducted the evaluation, and the result was determined based on a majority vote.

Damage to Strand

A: No change

B: A fine split and/or chipping occurred

C: A large split and/or chipping occurred

D: A reinforcing fiber in the inner part was damaged.

Slidability on the Target

A: No change in action

B: A small fluctuation that can be visually observed occurred in the movement of the wire C: A large fluctuation occurred in the movement of the wire and thus a deep chipping occurred Lightweight Property The following evaluation was performed based on the raw materials used in the strand and the target object for friction. It can be said that A was made of raw materials that were lightest. "Composite" means a composite material of a resin and a component other than the resin.

A: The strand was a composite, and the target object for abrasion was a composite or only a resin B: The strand was a composite, and the target object for abrasion was a metal C: The strand was only a metal, and the target object for abrasion was a composite or only a resin D. The strand was only a metal, and the target object for abrasion was only a metal Driving Properties The minimum winding radius of the obtained strand was evaluated. Five experts conducted the evaluation, and an average value was used as the result.

A: Winding radius of 20.0 mm or less

B: Winding radius of more than 20.0 mm and 76.2 mm or less

C: Winding radius of more than 76.2 mm

3. Examples 1 to 21 and Comparative Examples 1 to 3

Method for Producing Strand

On a surface of a core material 1 or 2 listed in Tables 1 to 4, a covering layer composition was extruded by using a coating device (model: ALM-LINE-CY), available from AIKI Riotech Corporation, and thus a covering layer was formed. The temperature of the covering layer composition during the extrusion was a temperature that was a melting point of the thermoplastic resin contained in the covering layer+40° C. The film thickness of the covering layer was adjusted by varying a movement speed of the core material while a discharging amount and a discharging pressure were each maintained at a constant, and thus a strand was obtained.

Various performances of the obtained strand were evaluated as described above.

Comparative Example 4

A strand was produced in the same manner as in Example 1 except for using no elastomer resin. The resin of the covering layer partially infiltrated into the carbon fiber, and adequate flexibility as the strand could not be ensured. Therefore, the evaluation described above was not performed.

Furthermore, as Reference Examples 1 to 3, cases where a stainless steel strand was used as the strand and a target object for abrasion listed in Table 4 was used were similarly; evaluated. As the stainless steel strand, a stainless steel wire rope, model CWS-28100, line size 2 mm, available from TRUSCO NAKAYAMA Corporation, was used.

TABLE 1-1

| | Example 1 | Example 2 | Example 3 | Example 4 | Example 5 | Example 6 | Example 7 |
|---|---|---|---|---|---|---|---|
| Type of reinforcing fiber | Core material 1 | Core material 1 | Core material 1 | Core material 1 | Core material 1 | Core material 1 | Core material 1 |
| Type of elastomer | Styrene-butadiene-based | Styrene-butadiene-based | Styrene-butadiene-based | Styrene-butadiene-based | Epoxy-based | Styrene-butadiene-based | Styrene-butadiene-based |
| Composition of covering layer composition | Whiskers + MXD10 | Whiskers + MXD10 | Whiskers + MXD10 | Whiskers + MXD10 | Whiskers + MXD10 | Whiskers + MXD10 | Whiskers + MXD10 |
| Elastic modulus of covering layer composition (MPa) | 3600 | 3600 | 3600 | 3600 | 3600 | 3600 | 3600 |
| Ratio of moduli of elasticity (elastomer/covering layer composition) | 0.00055 | 0.00055 | 0.00055 | 0.00055 | 0.00694 | 0.00055 | 0.00055 |
| Core material size (μm) | 950 | 950 | 950 | 950 | 950 | 950 | 950 |
| Covering layer thickness (μm) | 150 | 220 | 150 | 220 | 150 | 150 | 220 |

TABLE 1-1-continued

| | Example 1 | Example 2 | Example 3 | Example 4 | Example 5 | Example 6 | Example 7 |
|---|---|---|---|---|---|---|---|
| Target object for friction (second member) | Whiskers + MXD10 | Whiskers + MXD10 | MXD10 | MXD10 | Whiskers + MXD10 | SUS304 | SUS304 |
| Elastic modulus of second member composition (MPa) | 3600 | 3600 | 3400 | 3400 | 3600 | — | — |
| Damage to strand (10 times) | A | A | A | A | A | A | A |
| Damage to strand (50 times) | A | A | A | A | B | C | B |
| Slidability on target (10 times) | A | A | A | A | A | A | A |
| Slidability on target (50 times) | A | A | B | B | B | A | A |
| Lightweight property | A | A | A | A | A | B | B |
| Driving properties | A | A | A | A | B | A | A |

TABLE 2-1

| | Example 8 | Example 9 | Example 10 | Example 11 | Example 12 | Example 13 | Example 14 |
|---|---|---|---|---|---|---|---|
| Type of reinforcing fiber | Core material 1 | Core material 1 | Core material 1 | Core material 1 | Core material 1 | Core material 1 | Core material 1 |
| Type of elastomer | Styrene-butadiene-based | Styrene-butadiene-based | Styrene-butadiene-based | Styrene-butadiene-based | Styrene-butadiene-based | Styrene-butadiene-based | Styrene-butadiene-based |
| Composition of covering layer composition | Titanium oxide particles + MXD10 | MXD10 | MXD10 | MXD10 | MXD10 | MXD10 | MXD10 |
| Elastic modulus of covering layer composition (MPa) | 3400 | 3400 | 3400 | 3400 | 3400 | 3400 | 3400 |
| Ratio of moduli of elasticity (elastomer/covering layer composition) | 0.00058 | 0.00058 | 0.00058 | 0.00058 | 0.00058 | 0.00058 | 0.00058 |
| Core material size (μm) | 950 | 950 | 950 | 950 | 950 | 950 | 950 |
| Covering layer thickness (μm) | 150 | 190 | 290 | 190 | 290 | 190 | 290 |
| Target object for friction (second member) | Whiskers + MXD10 | Whiskers + MXD10 | Whiskers + MXD10 | MXD10 | MXD10 | SUS304 | SUS304 |
| Elastic modulus of second member composition (MPa) | 3600 | 3600 | 3600 | 3400 | 3400 | — | — |
| Damage to strand (10 times) | B | A | A | A | A | A | A |
| Damage to strand (50 times) | C | A | A | B | B | D | B |
| Slidability on target (10 times) | A | A | A | A | A | A | A |
| Slidability on target (50 times) | B | B | B | B | B | A | A |
| Lightweight property | A | A | A | A | A | B | B |
| Driving properties | A | A | A | A | A | A | A |

TABLE 3-1

| | Example 15 | Example 16 | Example 17 | Example 18 | Example 19 | Example 20 | Example 21 |
|---|---|---|---|---|---|---|---|
| Type of reinforcing fiber | Core material 1 | Core material 1 | Core material 1 | Core material 1 | Core material 1 | Core material 1 | Core material 2 |
| Type of elastomer | Styrene-butadiene-based | Styrene-butadiene-based | Styrene-butadiene-based | Styrene-butadiene-based | Styrene-butadiene-based | Styrene-butadiene-based | Styrene-butadiene-based |
| Composition of covering layer composition | PE | PE | PE | PE | PE | PE | Whiskers + MXD10 |
| Elastic modulus of covering layer composition (MPa) | 1100 | 1100 | 1100 | 1100 | 1100 | 1100 | 3600 |
| Ratio of moduli of elasticity (elastomer/covering layer composition) | 0.00182 | 0.00182 | 0.00182 | 0.00182 | 0.00182 | 0.00182 | 0.00055 |
| Core material size (μm) | 950 | 950 | 950 | 950 | 950 | 950 | 800 |
| Covering layer thickness (μm) | 290 | 330 | 290 | 330 | 290 | 330 | 180 |
| Target object for friction (second member) | Whiskers + MXD10 | Whiskers + MXD10 | MXD10 | MXD10 | SUS304 | SUS304 | Whiskers + MXD10 |
| Elastic modulus of second member composition (MPa) | 3600 | 3600 | 3400 | 3400 | — | — | 3600 |
| Damage to strand (10 times) | B | A | B | B | B | B | A |
| Damage to strand (50 times) | C | C | C | D | D | C | A |
| Slidability on target (10 times) | A | A | A | A | A | A | A |
| Slidability on target (50 times) | B | B | B | B | A | A | A |
| Lightweight property | A | A | A | A | B | B | A |
| Driving properties | A | A | A | A | A | A | A |

TABLE 4-1

| | Comparative Example 1 | Comparative Example 2 | Comparative Example 3 | Comparative Example 4 | Reference Example 1 | Reference Example 2 | Reference Example 3 |
|---|---|---|---|---|---|---|---|
| Type of reinforcing fiber | Core material 1 | Core material 1 | Core material 1 | Core material 1 | | | |
| Type of elastomer | Styrene-butadiene-based | Styrene-butadiene-based | Styrene-butadiene-based | — | SUS304 strand | SUS304 strand | SUS304 strand |
| Composition of covering layer composition | Absent | Absent | Absent | Whiskers + MXD10 | | | |
| Elastic modulus of covering layer composition (MPa) | — | — | — | 3600 | | | |
| Ratio of moduli of elasticity (elastomer/covering layer composition) | — | — | — | 0.00055 | — | — | — |
| Core material size (μm) | 950 | 950 | 950 | 950 | 2000 | 2000 | 2000 |
| Covering layer thickness (μm) | — | — | — | 150 | — | — | — |
| Target object for friction (second member) | Whiskers + MXD10 | MXD10 | SUS304 | Whiskers + MXD10 | Whiskers + MXD10 | MXD10 | SUS304 |
| Elastic modulus of second member composition (MPa) | 3600 | 3400 | — | 3600 | 3600 | 3400 | — |

TABLE 4-1-continued

| | Comparative Example 1 | Comparative Example 2 | Comparative Example 3 | Comparative Example 4 | Reference Example 1 | Reference Example 2 | Reference Example 3 |
|---|---|---|---|---|---|---|---|
| Damage to strand (10 times) | B | B | C | | A | A | A |
| Damage to strand (50 times) | D | D | D | | A | A | A |
| Slidability on target (10 times) | A | A | A | | C | C | A |
| Slidability on target (50 times) | B | B | A | | C | C | A |
| Lightweight property | A | A | B | | C | C | D |
| Driving properties | A | A | A | | C | C | C |

In the tables above, the core material size means a number average diameter of the core material. In a case where the cross-section is not circular, the diameter means a diameter in a case where the cross-section is converted into a circle having the identical area.

As is clear from the results described above, the strand of the present invention had excellent slidability. Furthermore, the strand had excellent lightweight property and excellent driving properties.

The strand of the present invention can improve slidability on a target material (target object for abrasion) compared to a metal strand, and can be preferably used as a driving part. In particular, slidability in a case where a target material is made of a resin or a fiber reinforced resin can be effectively improved.

Furthermore, compared to a metal strand, the weight can be reduced. As a result, operability is improved, and fuel economy of a driving mechanism when the strand is used as a driving mechanism part or the like is improved. In particular, when a driving part including a target material containing MXD10 containing 10 mass % of potassium titanate whiskers is formed, slidability is improved, and fuel economy of a driving mechanism is improved.

In addition, because the strand can have a constitution free of metals, excellent rust prevention property can be achieved. There are also advantages such that no noise occurs and injuries are less likely to occur.

REFERENCE SIGNS LIST

1 Covering layer
2 Core material
3 Reinforcing fiber
4 Polyester fiber
5 Elastomer
10 Strand
11 Iron ball
12 Target object for abrasion
13 Motor

The invention claimed is:

1. A driving part comprising:

a first member including a strand; and a second member in contact with the strand of the first member and containing a thermoplastic resin, wherein the strand includes a core material containing a reinforcing fiber impregnated with an elastomer and a covering layer containing a thermoplastic resin, wherein the second member contains a polyamide resin and a potassium titanate whisker, the polyamide resin containing diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms.

2. The driving part according to claim 1, wherein a composition of a covering layer of the strand and 70 mass % or greater of a composition of the second member are common.

3. The driving part according to claim 1, wherein the elastomer is a thermosetting elastomer.

4. The driving part according to claim 3, wherein an elastic modulus A and an elastic modulus B satisfy (the elastic modulus A/the elastic modulus B)<0.00500, where the elastic modulus A is measured in accordance with JIS K 7161:2019 after the elastomer is heated at a curing temperature of the elastomer for 2 hours and then subjected to temperature and humidity adjustment at 23° C. and a relative humidity of 55% for 2 weeks, and the elastic modulus B is measured in accordance with JIS K 7161:2019 after an ISO test piece having a thickness of 4 mm made of a covering layer composition constituting the covering layer is dried at 120° C. for 1 hour.

5. The driving part according to claim 1, wherein the covering layer contains a filler material having an aspect ratio (long side/short side) of 10 or greater.

6. The driving part according to claim 5, wherein the filler material having the aspect ratio (long side/short side) of 10 or greater contains a potassium titanate whisker.

7. The driving part according to claim 1, wherein the thermoplastic resin contains a covering layer polyamide resin.

8. The driving part according to claim 7, wherein the covering layer polyamide resin contains diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms.

9. The driving part according to claim 1, wherein the elastomer is an elastomer containing a styrene unit.

10. The driving part according to claim 1, wherein the reinforcing fiber is covered by yarn containing a polyester resin.

11. The driving part according to claim 1, wherein the reinforcing fiber contained in the core material contains a carbon fiber.

12. The driving part according to claim 1, wherein an elastic modulus A and an elastic modulus B satisfy (the elastic modulus A/the elastic modulus B)<0.00500, where the elastic modulus A is measured in accordance with JIS K 7161:2019 after the elastomer is heated at a curing temperature of the elastomer for 2 hours and then subjected to temperature and humidity adjustment at 23° C. and a relative humidity of 55% for 2 weeks, and the elastic modulus B is measured in accordance with JIS K 7161:2019 after an ISO test piece having a thickness of 4 mm made of a covering layer composition constituting the covering layer is dried at 120° C. for 1 hour; and the covering layer contains a filler material having an aspect ratio (long side/short side) of 10 or greater.

13. The driving part according to claim 1, wherein the covering layer contains a filler material having an aspect ratio (long side/short side) of 10 or greater and containing a potassium titanate whisker;

the thermoplastic resin contains a covering layer polyamide resin containing diamine-derived structural units and dicarboxylic acid-derived structural units, 70 mol % or greater of the diamine-derived structural units are derived from xylylenediamine, and 70 mol % or greater of the dicarboxylic acid-derived structural units are derived from an α,ω-linear aliphatic dicarboxylic acid having from 4 to 20 carbon atoms;

the elastomer contains an elastomer containing a styrene unit;

the reinforcing fiber is covered by yarn containing a polyester resin; and the reinforcing fiber contained in the core material contains a carbon fiber.

14. The driving part according to claim 1, wherein the second member contains a polyamide resin and a filler material having an aspect ratio (long side/short side) of 10 or greater.

* * * * *